US007292502B2

(12) United States Patent
Barger

(10) Patent No.: US 7,292,502 B2
(45) Date of Patent: Nov. 6, 2007

(54) SYSTEMS AND METHODS FOR PRODUCING A SOUND PRESSURE FIELD

(75) Inventor: James E. Barger, Winchester, MA (US)

(73) Assignee: BBN Technologies Corp., Cambridge, MA (US)

( * ) Notice: Subject to any disclaimer, the term of this patent is extended or adjusted under 35 U.S.C. 154(b) by 142 days.

(21) Appl. No.: 11/094,684

(22) Filed: Mar. 30, 2005

(65) Prior Publication Data

US 2006/0227980 A1 Oct. 12, 2006

(51) Int. Cl.
*H04B 1/02* (2006.01)
*H04B 3/00* (2006.01)

(52) U.S. Cl. ........................................ 367/138; 381/77

(58) Field of Classification Search ................. 381/77; 367/138–190, 92
See application file for complete search history.

(56) References Cited

U.S. PATENT DOCUMENTS 5,596,311 A 1/1997 Bess et al.
5,752,224 A * 5/1998 Tsutsui et al. .............. 704/225
7,088,829 B1 * 8/2006 Schick et al. .............. 381/71.4
2004/0264707 A1 * 12/2004 Yang et al. .................... 381/77
2006/0139205 A1 * 6/2006 Raestad et al. ............... 342/74

FOREIGN PATENT DOCUMENTS

EP 0 973 152 B1 3/2004

OTHER PUBLICATIONS

B. Moffett, et al. "Amplitude Pulse Propagation—A Transient", The Journal of the Acoustical Society of America, pp. 1473-1474, (1969) (Best available copy).
Mark F. Hamilton, "Nonlinear Effects In Sound Beams", Encyclopedia of Acoustics, (1997) (Best available copy).

* cited by examiner

*Primary Examiner*—Daniel Swerdlow
*Assistant Examiner*—Stephen C Hung
(74) *Attorney, Agent, or Firm*—Ropes & Gray LLP

(57) ABSTRACT

The invention provides, in various embodiments, a transducer for generating hyper-directional sound beams, and a system and method employing a hyper-directional sound transducer for producing pressure gradients and forces across stationary and moving objects.

16 Claims, 8 Drawing Sheets

SYSTEMS AND METHODS FOR PRODUCING A SOUND PRESSURE FIELD

STATEMENT REGARDING FEDERALLY SPONSORED RESEARCH AND DEVELOPMENT

This invention was made with government support under Contract Number HR0011-04-C-0086, awarded by the DARPA. The Government has certain rights in the invention.

FIELD OF THE INVENTION

The invention relates generally to the field of ultrasound and nonlinear acoustics. More particularly, in various embodiments, the invention relates to the generation of hyper-directional sound beams and to steering the hyper-directional sound beams to a desired location.

BACKGROUND

There are a number of different circumstances in which it is desirable to deliver a tightly focused sound beam to a particular location. One useful application is, for example, in advertising to prevent interference and confusion for listeners who hear mixed signals from different broadcasting sources. Higher power sound beams could be used, for example, for public announcements by targeting certain locations or groups of people during demonstrations or open air events. Sound beams with even higher power could be employed to induce physical discomfort in a person or to cause damage in livestock and property.

Hyper-directional sound beams can be produced by driving an acoustic source, such as a single acoustic transducer or an array of acoustic transducers, with a signal consisting of a high-frequency (ultrasonic) carrier wave that is modulated with a low-frequency sound signal. The high-frequency component of the sound wave is absorbed within a short distance from the acoustic source due to self-demodulation on passage through the transmission medium, such as air, leaving only a low-frequency waveform that is related to the modulation signal and that propagates at the speed of sound within the beam defined by the high-frequency signal.

The sound beams produced by the above technique may be focused, steered or projected in a defined area or direction, for example, by rotating or oscillating the acoustic transducer or by making use of digital beam-forming techniques employing phased arrays. The high-frequency audio signal is also not audible prior to demodulation.

While the foregoing arrangements are adequate for a number of applications, there is still a need for a method and system able to efficiently generate a high-power hyper-directional sound beam, and more particularly a sound beam, which produces a time-averaged non-zero sound pressure gradient and a time-averaged non-zero sound pressure force field at a location of a stationary or moving object to exert a net force on the object.

SUMMARY OF THE INVENTION

The invention addresses the deficiencies of the prior art by, in various embodiments, providing methods and systems for generating a high-power, hyper-directional sound beam and for controllably steering the sound beam to produce a pressure force field at a location of a stationary or moving object, which can exert a net force on the object.

According to one aspect, the invention provides a directional sound projector with a dielectric sound radiator having a base, a dielectric layer disposed on the base, and a conductive layer disposed on the dielectric layer. The sound radiator has a mechanical resonance frequency in an ultrasonic frequency range. The directional sound projector further includes a drive circuit, which applies a drive voltage between the base and the conductive layer for driving the sound radiator at a drive frequency within a range of frequencies including one half of the mechanical resonance frequency. The sound projector also includes a modulator for modulating the drive voltage with a modulation signal having a modulation frequency in an audible frequency range.

According to another aspect, the invention provides a system for applying a unidirectional pressure gradient to an object. The system includes a sound projector producing a directional low frequency sound beam that is self-demodulated from an ultrasonic carrier signal, a beam steering device that steers the directional beam toward the object, and a controller that controls the beam steering device to cause the sound projector to apply a pressure gradient to the object.

According to yet another aspect, the invention provides a method of applying a unidirectional pressure gradient across an object by generating an ultrasonic carrier signal, modulating the carrier signal with a low frequency signal, applying the modulated carrier signal to a sound projector, and steering the sound projector alternatingly towards opposing sides of the object at a frequency that depends on the frequency of the low frequency signal.

Embodiments of the invention may include one or more of the following features. The audible frequency range may encompass frequencies between about 0.1 Hz and about 20 kHz, or between about 1 Hz and about 10 kHz, or between about 10 Hz and about 500 Hz. The sound projector may include a detector coupled to the sound radiator for generating a feedback signal indicative of the mechanical resonance frequency. It may also include a controller for receiving the feedback signal and controlling the drive circuit to apply the drive frequency at one half of the mechanical resonance frequency. The sound projector may include a steering device for changing the orientation of the sound projector, and/or an array of sound transducers, with the beam steering device changing, for example, the phase of modulation signals applied to the transducers.

According to one feature, the object to which the sound pressure is applied is moving on a trajectory relative to the sound projector, and the controller controls the beam steering device based on the object's measured trajectory. In another embodiment, the pressure gradient across the object is substantially unidirectional with a direction that is substantially constant over a predetermined period of time. In one configuration, to apply the pressure gradient across the object, the sound projector is synchronized with movement of the moving object and steered in alternating directions with a frequency that is approximately twice the frequency of the low frequency signal, corrected for the speed of the moving object.

Further features and advantages of the invention will be apparent from the following description of illustrative embodiments and from the claims.

BRIEF DESCRIPTION OF THE DRAWINGS

These and other features and advantages of the invention will be more fully understood by the following illustrative description with reference to the appended drawings, in which like elements are labeled with like reference designations and which may not be to scale.

ILLUSTRATIVE DESCRIPTION

The invention, in various embodiments, provides systems, methods and devices for efficiently producing a hyper-directional, high-intensity sound beam, and more particularly systems, methods and devices that employ a hyper-directional sound beam to exert a net force on an object.

Figure 1:
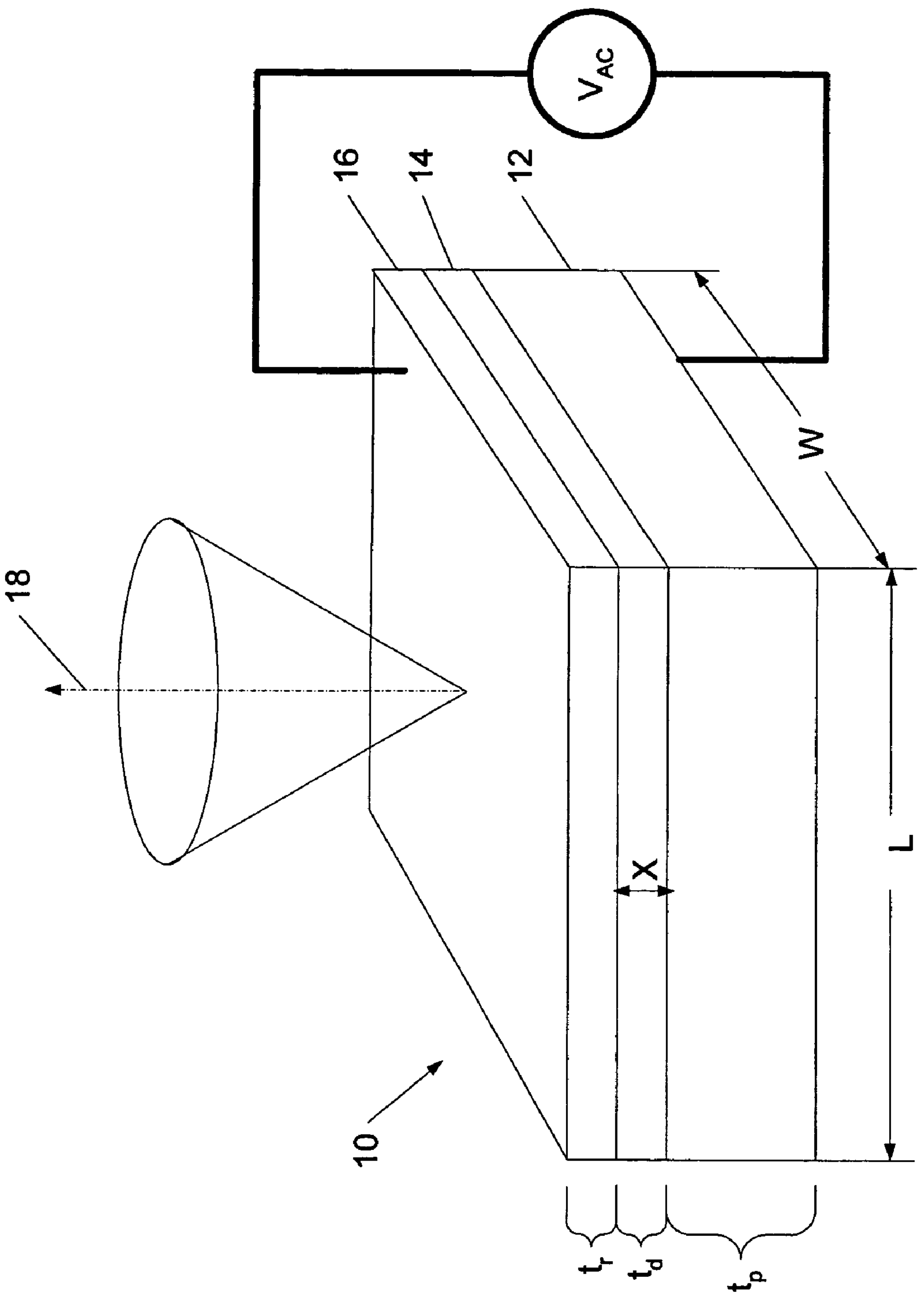
FIG. 1 shows an exemplary sound projector according to one embodiment of the invention.

FIG. 1 shows a disc-type sound projector, such as the exemplary illustrated electrostatic sound projector 10. The electrostatic sound projector 10 includes a projector base 12, a conductive top layer 16 and a dielectric layer 14 disposed between the base 12 and the conductive layer 16. The illustrative projector base 12 is a conductive metal plate of with W and length L and thickness $t_p$. A uniform sheet 14 of a suitable dielectric material of thickness $t_d$ is placed on top of the base 12. An electrically conductive top layer 16 of thickness $t_r$ is placed over the dielectric layer 14. The thickness $t_p$ of the base is much greater than the thickness $t_r$ of the top layer 16 radiating the sound power and therefore remains essentially stationary during operation. Although the illustrative sound projector 10 is shown as having a rectangular base, sound projectors with a differently shaped base, such a circular or polygonal base, can be used in embodiments of the invention. The dielectric sound projector 10 is driven by an electric AC voltage $V_{AC}$ applied across the dielectric layer 14 between the base 12 and the conductive layer 16. Unlike traditional loudspeakers, which are designed to operate over a wide frequency range and therefore have a broadband acoustic response, the hyper-directional sound projector 10 of the invention can advantageously be designed to have a mechanical resonance at a frequency selected as the ultrasonic carrier frequency, for example, a frequency between about 10 kHz and about 40 kHz. As described below, the sound projector 10 tends to have the highest electro-acoustic conversion efficiency when driven with an AC drive signal at approximately half the mechanical resonance frequency. Frequencies above about 15-20 kHz are above the audible range of human hearing.

The performance of the exemplary sound projector 10 can be calculated from equations of motion for the mechanical components and from electrical mesh equations for the projector connected in series with a fixed inductor (not shown) for improving the input drive power factor.

The equations of motion of the top sheet 16 can be written in terms of the instantaneous thickness x of the dielectric sheet 14, which is expands and contracts due to the electrostatic force generated between the base 12 and the top layer 16. Without an applied electric charge, $x=t_d$.

$$\frac{dx}{dt} = v \tag{1}$$

$$\frac{dv}{dt} = \frac{1}{M}\left[\frac{-Q^2}{2A\varepsilon} - v(R_m + R_r) - k(x - t_d)\right]$$

$$\frac{dQ}{dt} = I$$

$$\frac{dI}{dt} = \frac{1}{L}\left[V(t) - \frac{Q}{C} - IR_e\right] \text{ with } C = \frac{A\varepsilon}{x}$$

where M is the mass of the radiating sheet, $R_m$ is the mechanical viscous resistance of dielectric, $R_r$ is the radiation resistance on the radiating sheet, k is the mechanical stiffness of the dielectric sheet, $R_e$ is the electrical resistance of connecting wires, L is the aforementioned series inductance, I is the electric current driving the projector and Q is the electrical charge on the plates. v is the "piston velocity" of the sound projector, i.e. the rate of deflection of the top layer 16 in the direction 18 of the sound beam.

Hyper-directional audible sound beams can be generated by modulating the high-frequency ultrasonic drive voltage $V_{AC}$ (carrier signal), which is tuned to excite a mechanical resonance in the projector 10, with a periodic low-frequency envelope function E(t) in the range of, for example, several Hz to several hundred Hz, generating a primary axial beam with a pressure field p(r, 0, t) of $$p(r, 0, t) = \begin{cases} p_0 \cdot E(t) \cdot \sin(\omega_0 t) & \text{for } r \geq a \\ 0 & \text{for } r > a \end{cases} \tag{2}$$

where $p_0$ is the carrier signal amplitude, $\omega_0$ is the carrier frequency, and a represents an effective dimension of the radiating surface 16 of the sound projector 10. However, depending on the particular application, useful envelope frequencies may be less than several Hertz or greater than several hundred Hertz, as long as the low-frequency component in the hyper-directional ultrasonic sound beam is not significantly attenuated. Attenuation of sound waves is, inter alia, proportional to the square of the sound frequency. The frequency range of the low-frequency envelope function will also be referred to as "audible frequency range," although a particular frequency may not be perceived by the human ear.

With E(t) varying slowly in comparison with $\sin(\omega_0 t)$ and with strong absorption in the atmosphere ($\alpha_0 \cdot z_0 > 1$), an approximate quasi-linear solution for the axial pressure in the beam is given by $$p(0, z, t) = p_0\left[f(t) - f\left(t - \frac{\alpha^2}{2c_0 z}\right) + \frac{\beta p_0 a^2}{16\rho_0 c_0^4 \alpha_0 z} \cdot \frac{\partial^2 E^2}{\partial t^2}\right] * D(z, t), \tag{3}$$

where

-continued $$D(z,t)=\sqrt{\frac{c_0^3}{2\pi\delta z}}\cdot\exp\left(\frac{-c_0^3t^2}{2\delta z}\right)$$

is the dissipation function for a thermo-viscous fluid and the asterisk (*) designates convolution with respect to time, and $f(t)=E(t)\cdot\sin\omega_0 t$. The high-frequency component ($\omega_0$) is absorbed within the near-field ($z/a<\sqrt[3]{k_0 a}$), with only a distorted replica of the envelope E(t) remaining in the far-field. For $\alpha_0^{-1}<<z<<\alpha_E^{-1}$ and $$z<\frac{\pi a^2}{\lambda_0},$$

the far-field waveform becomes:

$$p(0,z,t)=\frac{\beta p_0^2 a^2}{16\rho c_0^4\alpha_0 z}\cdot\frac{\partial^2 E^2}{\partial\tau^2}\qquad(4)$$

where $\beta(\cong 1.2$ in air) is a parameter that characterizes the nonlinear propagation. $\alpha_0$ is the sound absorption parameter at the high (ultrasonic) frequency $\omega_0$, $\alpha_E$ is the sound absorption parameter at the envelope frequency $\omega_E$, $\rho$ is the air mass density, $c_0$ is the speed of sound, and z denotes distance from the sound projector along the beam.

The far-field pressure pulses then have a waveform proportional to the second derivative of the square of the envelope function, i.e.

$$E(t)=\sin(\omega_E t)\qquad(5)$$

and $$\frac{\partial^2 E^2(t)}{\partial t^2}=2\omega_E^2\cos(2\omega_E t).$$

The resulting far-field waveform then becomes $$p(0,z,t)=\frac{\beta p_0^2 a^2\omega_E^2}{8\rho c_0^4\alpha_0 z}\cdot\cos(2\omega_E t)\qquad(6)$$

The following examples provide design parameters for a dielectric sound projector 10, which when driven by a carrier signal that excites a mechanical resonance of the projector, can produce a sound pressure of between about 3 kPa and about 5 kPa. The two exemplary sound projectors share the following common parameters:

$$w=l=1[\text{m}]$$

$$t_r=t_d=0.5[\text{mm}]$$

$$f=9[\text{kHz}]$$

$$M=1/35[\text{kg}]$$

-continued $$k=(2\omega)^2M[N/\text{m}]$$

$$R_r=\rho cA[Ns/\text{m}]$$

$$R_e=10[\Omega]$$

$$L=\frac{1}{\omega^2C}[\text{Henry}]$$

$$\varepsilon=10\varepsilon_0=8.8510^{-11}[\text{Farad/m}]$$

$$R_m=\frac{M2\omega}{Q_m}[Ns/\text{m}]$$

where $Q_m$ is a quality factor related to the sharpness of the mechanical resonance of the sound projector.

EXAMPLE 1

Currently available dielectric materials have quality factors of $Q_m=10$ or less. Neoprene rubber with an elastic modulus of about 8.6 MPa and a breakdown field strength of 20 MV/cm can be used as a dielectric material in layer 14. With a drive voltage $V_0=2000$ Volt, a projector capacitance of about 350 nF, and an inductance of about 0.88 mH, the projector operates at a maximum dielectric strength of about 4 MV/cm, i.e., well below the breakdown field.

Figure 2:
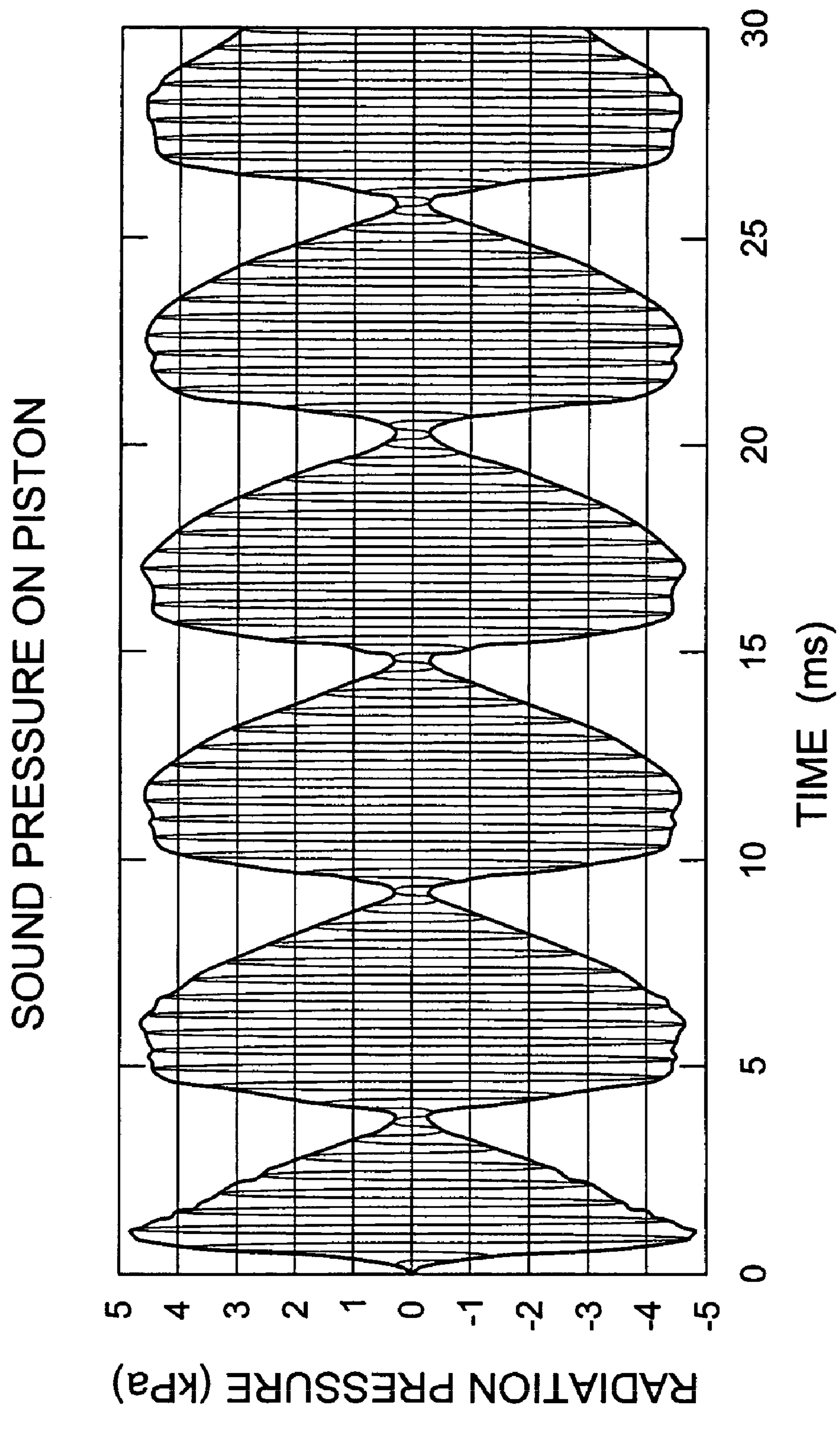
FIG. 2 shows the time-dependent sound pressure produced by the exemplary sound projector of FIG. 1 with a quality factor of 10 and sinusoidal modulation.

FIG. 2 shows a diagram of the sound pressure produced close to the radiating surface 16 of the sound projector 10. The ultrasonic carrier signal with a frequency $\omega_0=18$ kHz is here modulated with an sinusoidal envelope frequency of $\omega_E=90$ Hz to produce a sound beam with a peak pressure of 4.5 kPa (equal to about 24 kW) and a modulation period of 5.5 ms. A drive power of approximately 240 kW is required to produce the sound beam, with the overall power conversion efficiency of the system approximately 10%. The dominant parameter in a projector's performance is the mechanical loss in the dielectric layer 14. An improved performance can be expected by reducing the mechanical loss and increasing the permittivity, breakdown strength, and drive voltage. However, as seen in FIG. 2, the sound pressure is somewhat asymmetric due to nonlinearities in the system.

Figure 3:
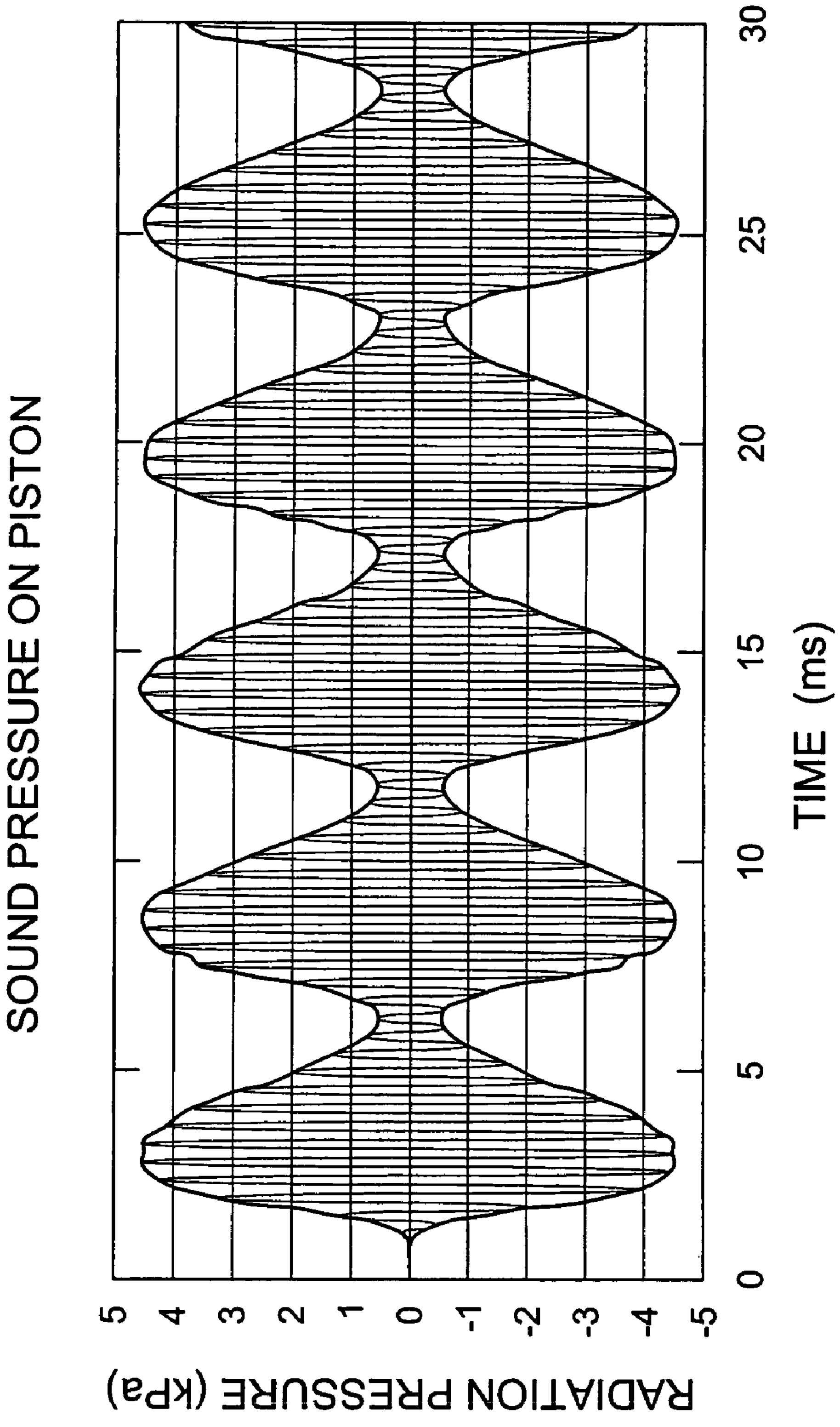
FIG. 3 shows the time-dependent sound pressure produced by the exemplary sound projector of FIG. 1 with a quality factor of 10 and $\sin^2$-modulation.
Figure 3A:
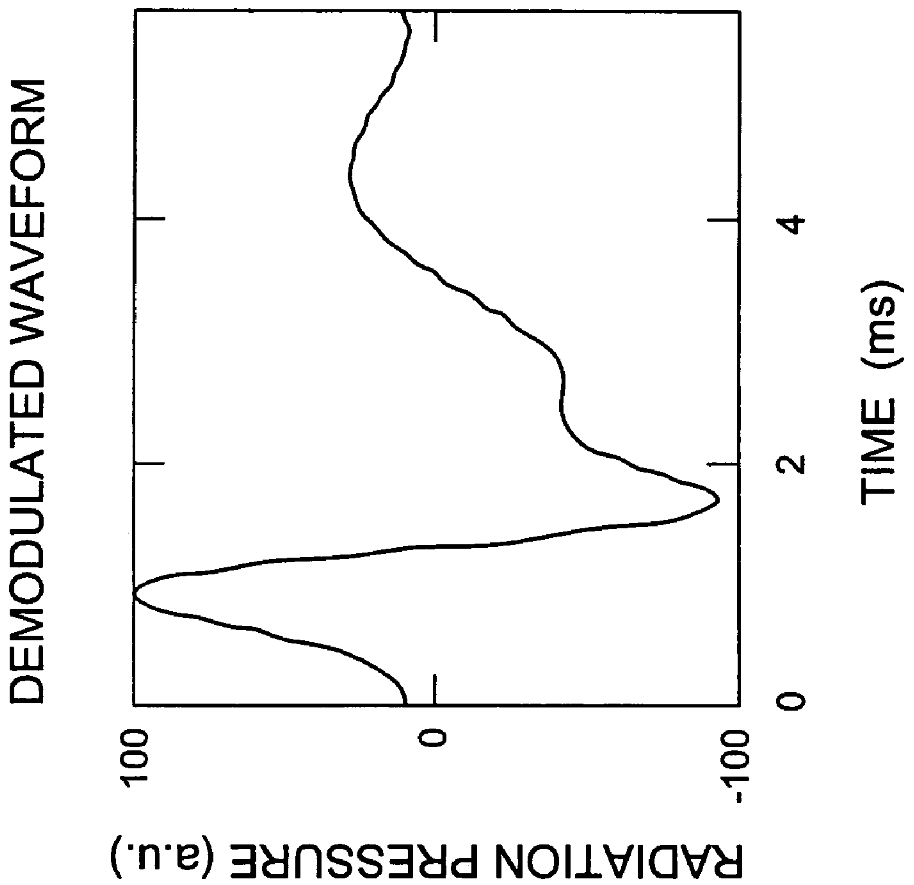
FIG. 3A shows one cycle of the sound pressure of the sound beam of FIG. 3 after self-demodulation in air.

FIG. 3 shows a diagram of the sound pressure produced close to the radiating surface 16 of the sound projector 10 when the drive voltage is modulated by a $\sin^2(\omega_E t)$ function rather than by $\cos(\omega_E t)$ function, as in the example of FIG. 2. The radiated acoustic output power is here approximately 10 kW for an electric input power of about 188 kW, giving an electro-acoustic power conversion efficiency of about 5.5%. FIG. 3A shows one cycle of the demodulated sound pressure waveform that appears in the sound beam after self-demodulation in air, i.e., after the carrier waveform has been absorbed. The waveform is slightly distorted from the theoretical waveform, $\cos(2\omega_E t)$, due in part to the narrow bandwidth of the sound projector 10.

EXAMPLE 2

Figure 4:
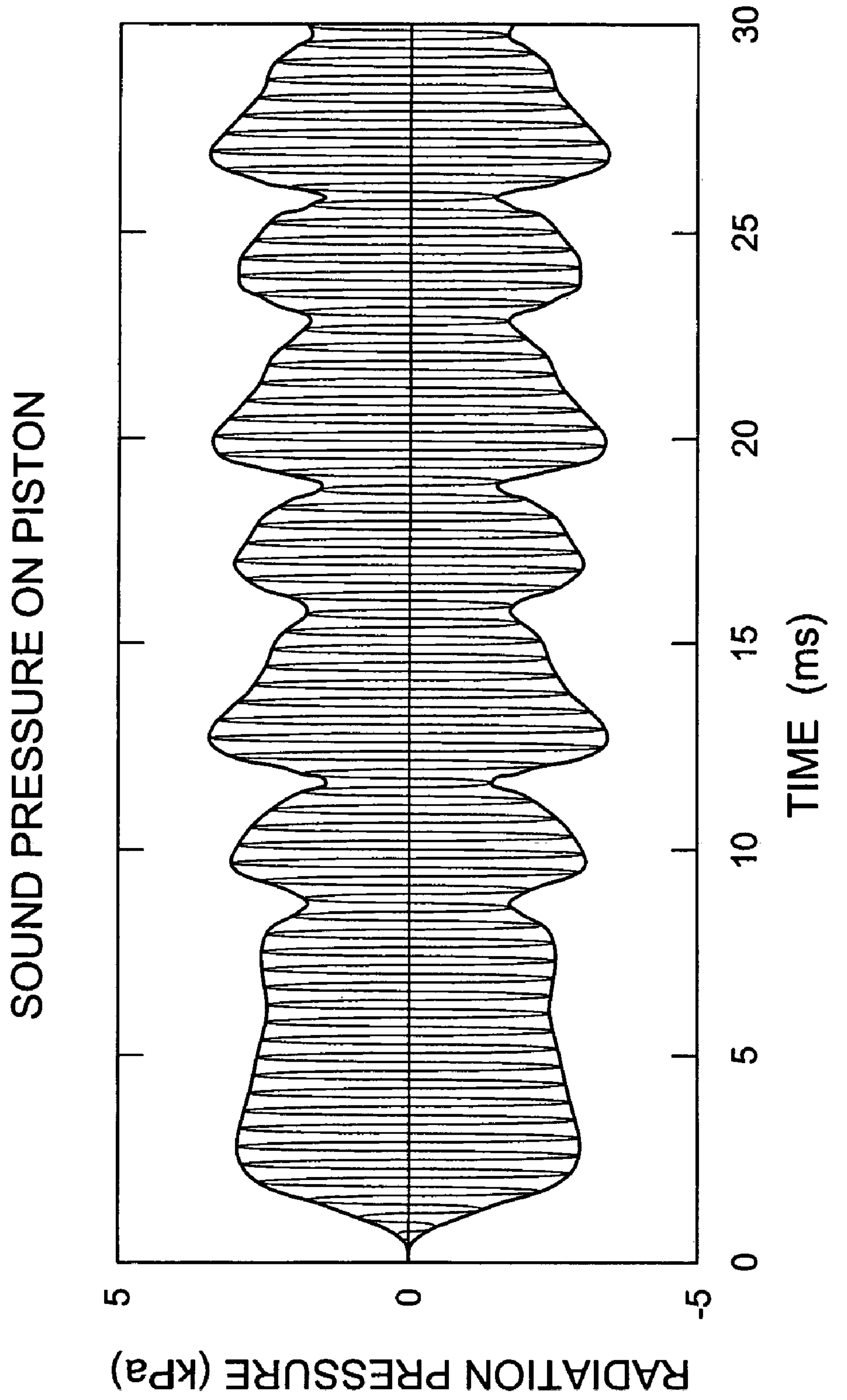
FIG. 4 shows the time-dependent unmodulated sound pressure produced by the exemplary sound projector of FIG. 1 with a quality factor of 100.

As mentioned above, the overall electro-acoustic power conversion efficiency increases with the quality factor $Q_m$. FIG. 4 shows a diagram of the time-dependent sound pressure produced by a sound projector 10 with a quality factor $Q_m=100$ during the first 30 ms of operation. The quality factor $Q_m$, i.e., the sharpness of the mechanical resonance of the sound projector, can be increased, for example, by selecting a dielectric material with a suitable dielectric strength and resiliency. The sound projector in this example produces a peak sound pressure of approximately 3 kPa (equal to a sound power in the beam of about 7.5 kW) at an ultrasonic drive voltage of $V_0$=500 Volt, corresponding to an average electric input power of about 23 kW. The overall electro-acoustic power conversion efficiency is approximately 33%. At this relatively high drive voltage level, a periodic envelope with a peak-to-peak separation of approximately 3.5 ms develops after an initial settling time of approximately 7 ms due to nonlinearities in the governing equations, without external low-frequency modulation of the carrier signal. This envelope will be self-demodulated in the sound beam. The performance of this exemplary projector tends to saturate at a drive levels above 500 V. Different parameters could shift the saturation level to higher voltages, allowing for greater sound power radiation. Factors that increase the saturation level are, for example, the dielectric thickness, mechanical quality factor, dielectric permittivity, and the drive frequency.

It has been observed that, for the same quality factor $Q_m$=100, the envelope self-modulation can be substantially eliminated by lowering the drive voltage to $V_0$=200 V. However, lowering the drive voltage also reduces the sound pressure amplitude from about 3 kPa in FIG. 4 to approximately 1.5 kPa, without a reduction in the overall electro-acoustic power conversion efficiency. Modulating the high frequency drive voltage with a low frequency envelope frequency $\omega_E$ would produce a time-dependent sound pressure curve similar to the diagrams shown in FIGS. 2, 3, and 3A.

Figure 5:
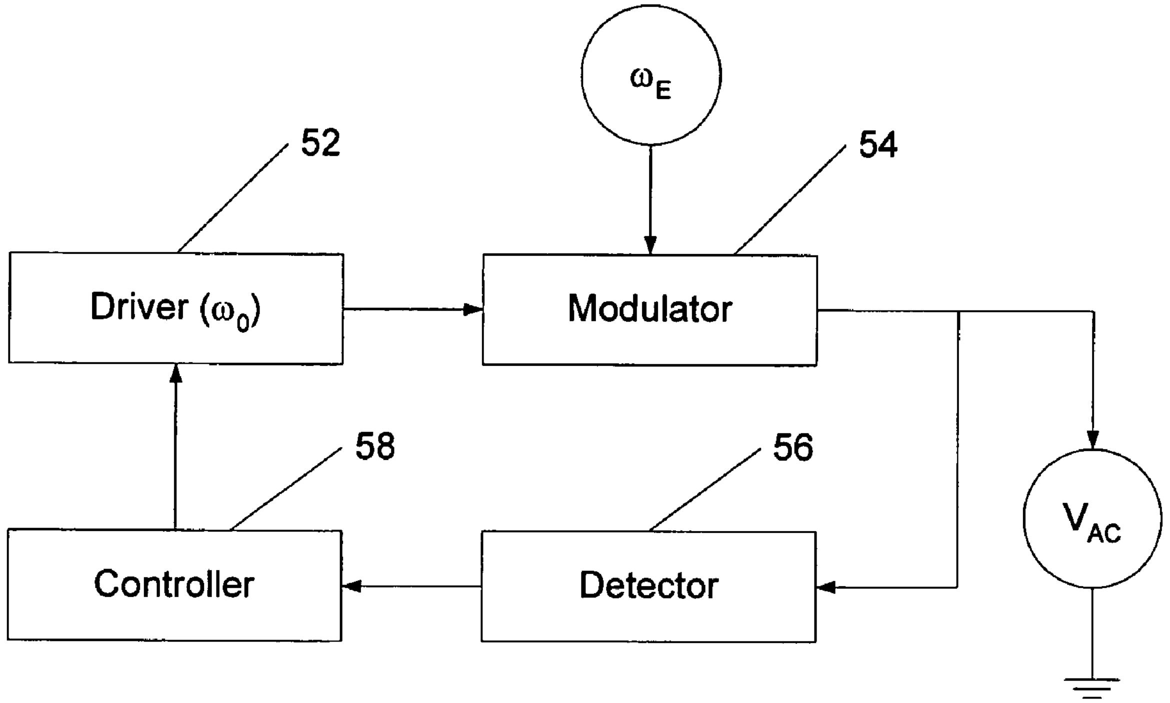
FIG. 5 shows a schematic block diagram of a system for monitoring the operation of the exemplary sound projector of FIG. 1.

Systems with a large quality factor $Q_m$ may require that the frequency and phase of the ultrasonic drive signal be precisely tuned to the mechanical resonance of the system and maintained during operation. It may therefore be necessary to monitor the motion of the driven electro-acoustic transducer and use the monitored signal as feedback to control the drive signal. FIG. 5 shows a schematic block diagram of a system for monitoring the operation of an electro-acoustic transducer, such as the illustrative transducer 10 of FIG. 1. The voltage source $V_{AC}$ of transducer 10 is driven by a driver circuit 52, which generates the ultrasonic carrier signal with frequency $\omega_0$. The carrier signal is modulated in modulator 54 with the low-frequency envelope signal at frequency $\omega_E$, and the modulated signal is supplied to the voltage source $V_{AC}$ applied across the transducer 10 (see FIG. 1). A detector 56 monitors a signal from the transducer 10 representative of the mechanical resonance of the transducer 10, for example, a change in the transducer's capacitance, and supplies a feedback signal to a controller 58, which generates a control signal for causing the driver 52 to drive the transducer 10 at its mechanical resonance frequency.

In one application, hyper-directional sound beams can be directed to specific areas, for example, in public settings to convey advertising and informational material to a limited audience. High intensity hyper-directional sound beams, such as sound beams produced with the illustrative sound projector 10 of FIG. 1, can be aimed at specific targets, for example, for non-lethal crowd control.

In another application, high intensity hyper-directional sound beams can be used to subject a target to a pressure gradient and thereby a force. For example, a peak pressure of about 170 Pa can be produced at a distance of 30 m from the sound projector 10 operating at or near resonance at a carrier frequency of $\omega_0$=10 kHz and an envelope modulation frequency of $\omega_E$=85 Hz. The wavelength of this radiation is equal to 8 m, which is much larger than the dimensions of the human body. The resulting force on the body, assuming a volume of 1 $m^3$, is equal to the product of pressure gradient times the volume, or about 520 N, which would induce significant discomfort in the person.

Figure 6:
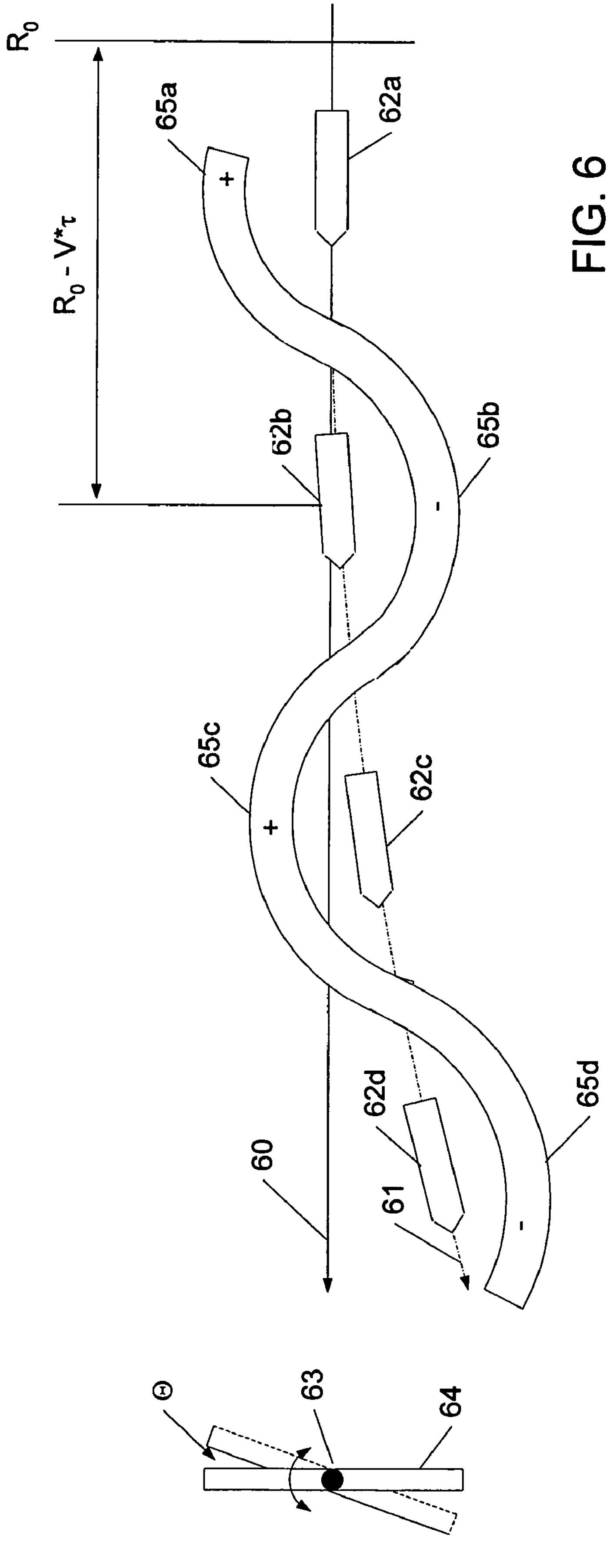
FIG. 6 depicts an exemplary application of sound pressure to deflect a moving target.

In yet another application depicted in FIG. 6, high intensity hyper-directional sound beams can be used to produce a unidirectional pressure gradient at the location of a stationary or moving target 62*a* to deflect the target 62*a* from its initial course 60. In the illustrative example, the target 62*a*, for example a projectile or a rocket, moves from a location 62*a* on its initial course 60 toward the sound projector 64 that can be mounted, for example, on a rotatable structure indicated by the double arrow 63. The sound projector 64 emits a modulated ultrasonic sound wave that self-demodulates in the atmosphere, as described above, producing a positive pressure at a location 65*a* when the projectile passes location 62*a*. The positive pressure changes the initial course 60 of the projectile to a new trajectory 51. The sound projector 64 is then controlled, for example redirected, to produce a negative pressure at location 65*b* when the projectile reaches position 62*b* on the altered trajectory 61, thereby further deflecting the projectile away from the initial course 60. This process repeats, with positive pressure produced at location 65*c* when the projectile reaches location 62*c*, and negative pressure produced at location 65*d* when the projectile reaches location 62*d*.

The direction and timing of the hyper-directional sound beam emanating from the sound projector 64 must be synchronized with the movement of the target. The sound projector 64 steering angle θ needed to radiate the positive pressure phase to one side and the negative pressure phase to the other side of the target 62*a* increases with time because the target locations 62*b*, 62*c*, 62*d* are getting closer to the sound projector 64. Assuming that the target is detected at time τ=0 at a distance $R_0$ and moves toward the sound projector 64 with a velocity V. The steering angle θ(τ) then becomes:

$$\Theta(\tau) = \frac{a \cdot \sin(2\omega_E t)}{R_0 - \frac{V \cdot \tau}{1 - M}} \tag{7}$$

where M is the Mach number of the target. As seen from eq. (7), the timing of the steering angle θ also depends on the envelope modulation frequency $\omega_E$, which may be adjusted accordingly.

Figure 7:
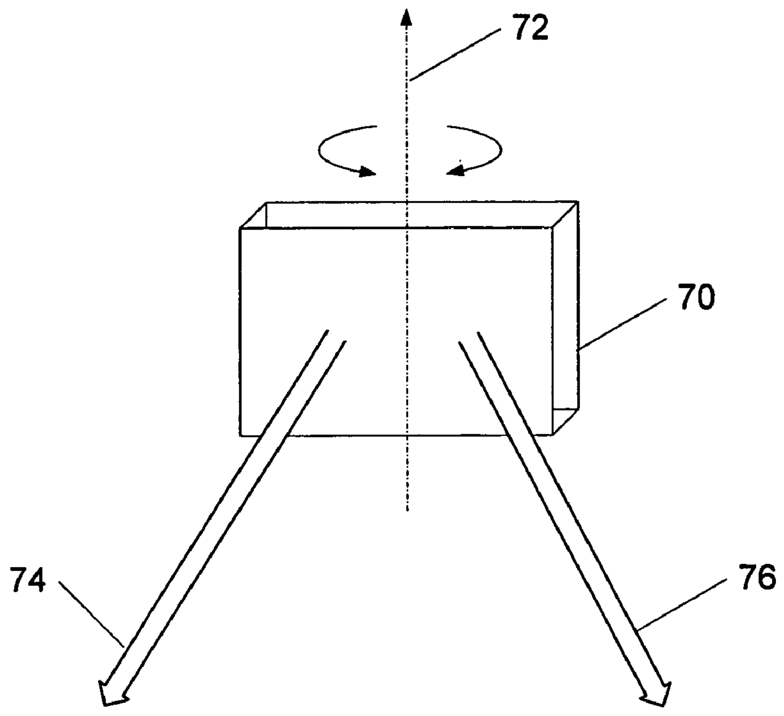
FIG. 7 shows schematically a mechanically steerable sound projector.

As shown in FIG. 7, in one embodiment the hyper-directional sound beam emanating from a sound projector 70 can be steered in different directions 74, 76 by rotating the sound projector 70 about at least one axis, such as axis 72. For aiming the sound beam in three dimensions, the sound projector can be mounted, for example, on a gimbal mount.

Figure 8:
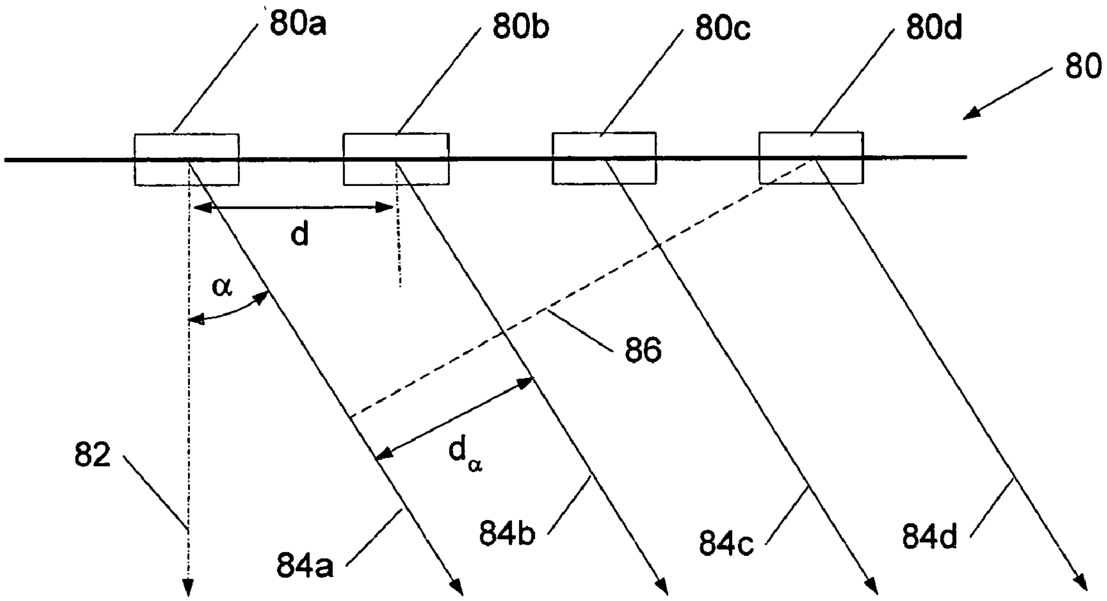
FIG. 8 shows schematically a steerable sound projector implemented as a phased array.

FIG. 8 shows another illustrative embodiment of a steerable hyper-directional sound projector 80 implemented as a linear or two-dimensional phased array of sound transducers, such as exemplary transducers 80*a*, 80*b*, 80*c*, 80*d*. The illustrative transducers 80*a*, 80*b*, 80*c*, 80*d* are spaced apart by a distance d, and each transducer is driven by a high-frequency carrier signal of frequency $\omega_0$ that is modulated by a low frequency envelope signal of frequency $\omega_E$. The phase of the drive voltage of each of the transducers 80*a*, 80*b*, 80*c*, 80*d* can be adjusted so that the sound beams 84*a*, 84*b*, 84*c*, 84*c* emanating from the respective transducers 80*a*, 80*b*, 80*c*, 80*d* have the same phase and generate a combined sound beam with a planar wavefront 86. The emission angle 60 of the combined sound beam relative to the surface normal 82 of the array 80 is determined by the relative phase of the drive voltage.

It will be understood that mechanical beam steering or phased-array beam steering can be used separately or in combination. As also seen in FIG. 8, the effective beam width $d_\alpha$ decreases with increasing offset angle $\alpha$, which according to eq. (6) can affect the far-field sound pressure.

While the invention has been disclosed in connection with the preferred embodiments shown and described in detail, various modifications and improvements may be made thereto without departing from the spirit and scope of the invention. By way of example, although the illustrative embodiments have been described in conjunction with applying a net pressure to a stationary or moving object, this need not be the case. Instead, the hyper-directional sound beams may be used for non-lethal crowd control while avoiding collateral damage to bystanders. Moreover, because the method and systems rely on self-demodulation of an ultrasonic sound beam, the sound appears to emanate from empty space, making it difficult to detect the location of the sound projector. Accordingly, the spirit and scope of the present invention is to be limited only by the following claims.

What is claimed is:

1. A system for applying a unidirectional pressure gradient to an object, comprising:

a sound projector producing a directional low frequency sound beam that is self-demodulated from an ultrasonic carrier signal;

a beam steering device that steers the directional low frequency sound beam toward the object; and a controller that controls the beam steering device to cause the sound projector to apply a pressure gradient to the object;

wherein the frequency of the ultrasonic carrier signal is approximately one half of a resonance frequency of a transducer element of the sound projector.

2. The system of claim 1, wherein the pressure gradient has a direction that is constant over a predetermined period of time.

3. The system of claim 1, wherein the beam steering device changes an orientation of the sound projector.

4. The system of claim 1, wherein the sound projector comprises an array of sound transducers, and the beam steering device changes at least a phase of modulation signals applied to the transducers.

5. The system of claim 1, wherein the object is moving relative to the sound projector on a trajectory.

6. The system of claim 5, wherein the controller controls the beam steering device based on the trajectory.

7. The system of claim 1, wherein the audible frequency range includes frequencies between approximately 0.1 Hz and approximately 20 kHz.

8. The system of claim 1, wherein the audible frequency range includes frequencies between approximately 1 Hz and approximately 10 kHz.

9. The system of claim 1, wherein the audible frequency range includes frequencies between approximately 10 Hz and approximately 500 Hz.

10. A method of applying a unidirectional pressure gradient across an object, comprising:

generating an ultrasonic carrier signal;

modulating said ultrasonic carrier signal with a low frequency signal;

applying said modulated carrier signal to a sound projector; and steering the sound projector alternatingly towards opposing sides of the object at a frequency that depends on the frequency of the low frequency signal.

11. The method of claim 10, wherein the frequency for alternatingly steering the sound projector is approximately twice the frequency of the low frequency signal.

12. The method of claim 10, wherein the object moves along a trajectory, the method further comprising synchronizing the direction of the sound projector with movement of the moving object so as to apply the unidirectional pressure gradient.

13. The method of claim 12, further comprising determining an initial trajectory of the moving object.

14. The method of claim 10, further comprising mechanically steering the sound projector.

15. The method of claim 10, further comprising steering the sound projector by adjusting a phase of an array of sound transducers.

16. The method of claim 10, wherein generating the self-demodulated sound beam includes adjusting a frequency of the carrier signal to approximately one half of a resonance frequency of a transducer element of the sound projector.

* * * * *